184-105.3 SR
A6039 XR RE 16,787
Nov. 22, 1927.
Re. 16,787
C. F. WALLACE
GREASE CONTAINER
Original Filed Jan. 11, 1922
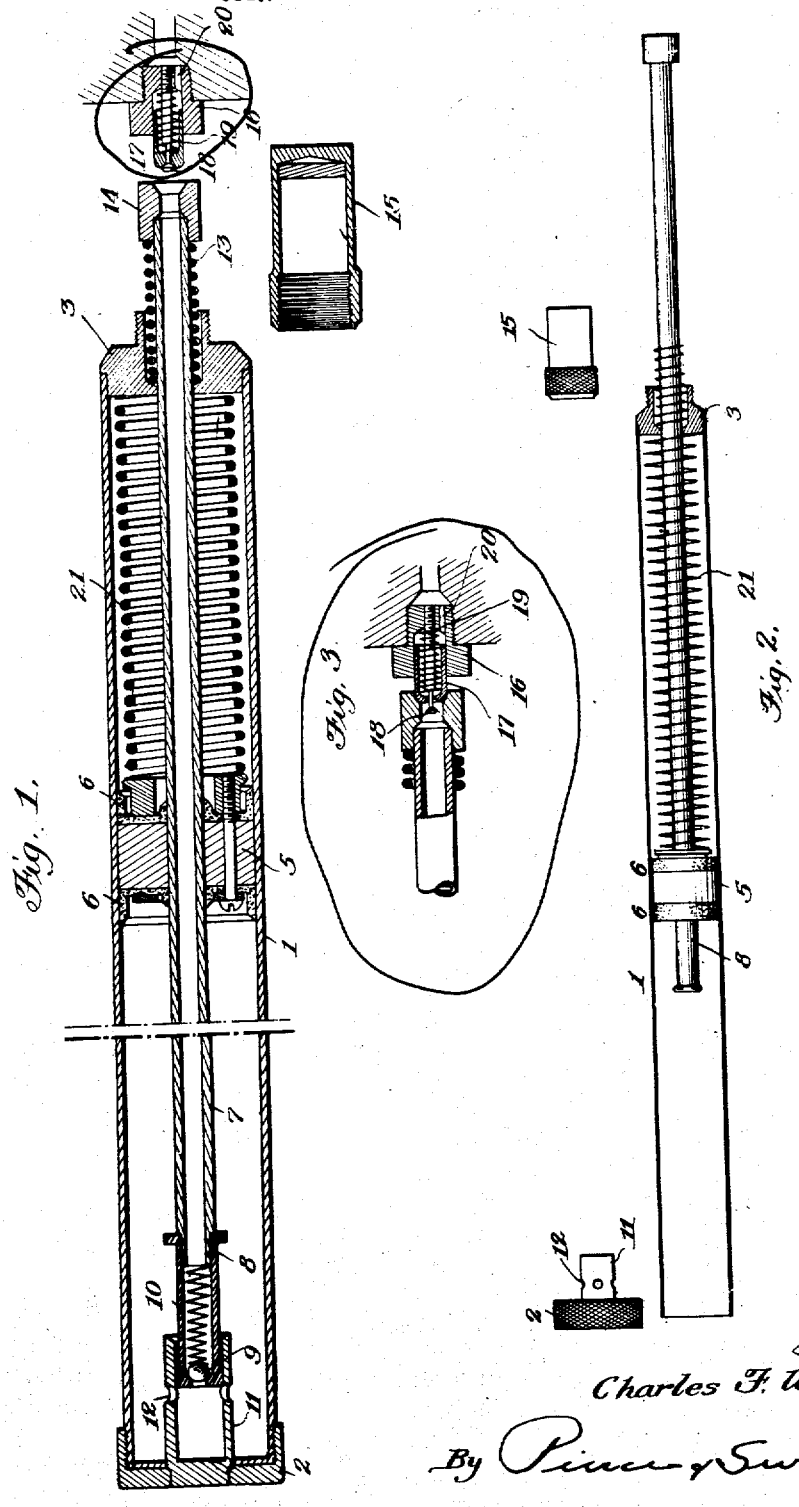
Inventor
Charles F. Wallace
By Pierce & Swift
Attys.

Reissued Nov. 22, 1927. Re. 16,787

UNITED STATES PATENT OFFICE.

CHARLES F. WALLACE, OF WESTFIELD, NEW JERSEY, ASSIGNOR TO THE BASSICK MANUFACTURING COMPANY, OF CHICAGO, ILLINOIS, A CORPORATION OF DELAWARE.

GREASE CONTAINER.

Original No. 1,494,652, dated May 20, 1924, Serial No. 528,422, filed January 11, 1922. Application for reissue filed October 8, 1925. Serial No. 61,380.

The invention for which by these presents I seek protection by Letters Patent of the United States, is an improvement in forced feed lubricating devices, more commonly known as grease guns, which in general may be described as means for applying under a certain pressure, the lubricant to such parts as the bearings of internal combustion engines and the like.

Usually such parts are lubricated by heavy oil or grease stored in permanent receptacles attached to the engine, or by means which require the removal of caps or other parts to permit access to the bearings, and by devices which are unhandy and more or less difficult to use or manipulate. My object has been, in the devising of the means hereinafter set forth, to produce a simple and thoroughly practicable device that will accomplish the desired results more quickly and easily than others heretofore intended or used for this purpose, and to this end my improvement comprises a cylinder containing a spring actuated piston and constituting the reservoir for a heavy oil or grease, and having a tube longitudinally movable therein against spring pressure provided with a grease pump at the rear end, and a discharge conical cavity at the forward end which is designed to fit over a specially designed connection attached to the part to be lubricated.

This device in the most practicable form in which I have produced it is illustrated in the accompanying drawing, in which Figure 1 is a longitudinal section of the grease gun, showing detached therefrom a screw cap and the device connected to the part to be lubricated through which the grease is forced.

Figure 2 is a general view, mainly in elevation of the same device, the two caps being shown as detached.

Figure 3 is a sectional view of the discharge end of the gun in operative relation to the connection to the bearing or other part to be lubricated.

The main portion of the body of the instrument is a metal cylinder 1, threaded at its rear end to receive a cap 2, and having at its forward end a closing head 3 provided with a threaded extension 4. Within this cylinder is a piston 5 with double cap leathers 6 and a spiral spring 21 intermediate said piston and the head 3. The function of this spring is merely for the purpose of maintaining the piston in contact with the body of contained lubricant in order that the latter may be maintained at the rear end of the container in all positions of the latter. It does not have sufficient force to do more than this.

Extending entirely through the cylinder 1 is a tube 7, the piston 5 and the head 3 having suitable openings through them to permit its free passage. The rear end of the said tube carries a cap or extension 8 having a perforated closed end and containing a ball valve 9 seated on a spiral spring 10.

The cap 2 has a cylindrical extension 11 with ports 12, and fits snugly over the cap or extension 8.

At the forward end of the instrument a spiral spring 13 is interposed between a head 14 and the head 3, the said head 14 being screwed to the end of the tube 7. This head 14 forms the discharge end of the tube and is formed with a conical cavity. A screw cap 15 is used to close the tube 7 when the device is not in use, and this cap screws onto the extension 4.

With this device are used connections with the bearings or other parts to be lubricated consisting of plugs 16 hollowed out to receive a movable cup 17 and a plunger 18, with a head that normally closes the passage into the plug, and a spiral spring 19 that tends to keep the passage into the plug closed. These plugs are set or screwed into the stationary parts of the apparatus to be lubricated and contain passages 20 leading to the bearings or other parts which are to receive the lubricant.

The operation of the device is as follows:

To fill the gun the cap 2 is removed and the heavy oil or grease is either drawn or packed in until the piston 5 is forced back to the limit of the possible compression of the spiral spring, when the cap 2 is replaced. The tube 7 may be drawn out of the forward end of the container engaging with the piston 5 and moving the same to create the motion that draws in the lubricant. The only function of the spring 21 is thereafter to keep the piston 5 firmly against the body of grease within the cylinder.

When lubricant is to be applied the cap 15 is removed and the conical cavity in the head 14 is placed over the rounded end of the cup of the plug 16. The cylinder 1 is then forced forward one or two times with the result that the parts 8 and 12, acting as a force pump when the rear end of the tube 7 is forced into the cylindrical extension 11, force grease through the tube 7 and thence through the opening in the cup 17, formed when said cup is forced back by the pressure applied to the cylinder 1.

When pressure on the cylinder ceases, the spring 13 compressed by such pressure withdraws the valve containing cap 8 from the hollow extension 11 and this draws in the grease from the cylinder 1 through the ports 12, and in this way a measured quantity of grease may be injected into and through the connections 14 at each stroke or forward movement of the device.

This device has many advantages. No fixed connections between the grease supply and the parts to be lubricated are necessary. The bearings or other parts are always closed to prevent access of dirt thereto. The rounded head of the connection and the conical cavity in the tube 7 constitute a ball and socket joint, thus permitting the device to be applied and used at widely varying angles, and the rounded top of the connection may be readily cleaned before applying the grease gun.

Broadly considered the plug connection by which the grease is introduced, is any device in which the pressure of the gun or the pressure of the grease in the gun opens the passage to the parts to be lubricated, and the connection illustrated is merely typical of such devices. It should further be pointed out that the area of the pump in the grease gun must be equal to or greater than the area of contact between the gun and the grease cup or connection as otherwise the grease would escape at the entrance at the end of the gun when pressure is applied to operate the pump.

By means of this device a considerable number of bearings or other parts may be lubricated in much shorter time than is now required for the proper use of any other device for a similar purpose of which I am aware.

Having now described my improvement of its mode of operation or use, what I claim is:—

1. A forced feed lubricating device comprising in combination, a container, a removable cap closing its rear end, a spring-actuated piston occupying the forward part of the container, a longitudinally movable tube extending through the container and the piston and having a projecting part that engages with and moves the piston when it is drawn forward and compresses the piston spring, thereby providing back of said piston a suction that may be utilized for filling the container with lubricant when the cap is removed.

2. A forced feed lubricating device comprising in combination, a container for the lubricant, a longitudinally movable tube extending through the container, a force pump at the rear of the container operated by the reciprocatory movement of said tube, a piston through which said tube passes, and a spring acting on said piston with only sufficient force to maintain it in contact with the contained lubricant.

3. A forced feed lubricating device comprising in combination, a container for the lubricant and a spring-seated piston therein adapted by the force of its spring to be merely maintained in contact with the body of contained lubricant, a pump chamber containing side perforations attached to the rear end of the container, a longitudinally movable lubricant tube with a closed end extending through the container and forming with the pump chamber a piston tube, a valve in the closed end of said tube, and a spiral spring acting upon the tube and having sufficient force to restore the same after it has been forced back and thereby create in the pump a suction which fills it with lubricant.

4. A forced feed lubricating device comprising in combination, a cylindrical container, a reciprocatory tube extending through the same, and a force pump at the rear end of the container for which said tube constitutes the piston, said tube having a valve controlled orifice in its rear closed end, and a passage for lubricant in its forward end, the areas of the said passage and of the force pump chamber being different, for the purpose set forth.

5. A device of the kind described, comprising in combination, a cylindrical grease container, a piston therein, a spring acting upon said piston with only sufficient force to maintain it in contact with the contained lubricant, a hollow tube extending through the forward end of the container and the piston, a force pump connected with the rear end of the tube, which operates to force lubricant from the container through the tube when the latter is pushed back into the container and a spring acting upon said tube to withdraw it from its pushed back position therein.

6. A device of the kind described, comprising in combination, a cylindrical grease container, a cap for the rear end thereof having a hollow extension with ports in its side walls, a spring seated piston in the container, a spring acting upon said piston with only sufficient force to maintain it in contact with the contained lubricant, a reciprocatory tube extending longitudinally through the container and piston, and a valve controlled attachment at its end which enters the hollow extension in the cap, and forms therewith a pump to force lubricant from the container through the tube.

7. A lubricating system comprising a lubricant receiving member having a rounded head provided with a passageway for lubricant, and a compressor for supplying lubricant to said receiver comprising a container for lubricant, a discharge tube reciprocable with respect to said container and communicating with said container, means actuated by the reciprocation of said container with respect to said discharge tube for forcing lubricant under pressure through said discharge tube, means slidably mounted in said container for exerting pressure on the lubricant therein, and means carried by the outer end of said discharge tube for making sealed contact with said rounded head from any one of a plurality of angularly related positions, said last named means being actuated by the pressure exerted against said container toward said member, in reciprocating said container, to maintain a sealed connection with said rounded head.

8. A lubricating system comprising a lubricant receiving member having a head provided with a passageway for lubricant, and a compressor for supplying lubricant to said receiver, comprising a container for lubricant, a discharge tube reciprocable with respect to said container and communicating with said container, means actuated by the reciprocation of said container with respect to said discharge tube for forcing lubricant under pressure through said discharge tube, and means carried by the outer end of said discharge tube for making sealed contact with said head from any one of a plurality of angularly related positions, said last named means being actuated by the pressure exerted against said container toward said member, in reciprocating said container, to maintain a sealed connection with said head.

9. A lubricating system comprising a receptacle for receiving lubricant, said receptacle comprising a spherical head and a compressor comprising a container, means in said container for exerting pressure on the lubricant therein, a cylinder, a discharge tube communicating with said cylinder and terminating in a member having a depression, communicating with said discharge tube, for making sealed contact with said head from any one of a plurality of different angular positions, and means interposed between said cylinder and said tube for placing pressure, greater than the pressure in said container, upon the lubricant discharged through said tube, when a force is applied to said compressor in the direction of said fitting, said force being effective in maintaining a sealed connection between said discharge tube and said head.

10. A lubricating system comprising a lubricant receiving member having a passageway for lubricant, and a compressor for supplying lubricant to said receiver, comprising a container for lubricant, a discharge tube coaxial with, and reciprocable with respect to said container, means interposed between, and effecting communication between said container and said discharge tube for forcing lubricant under pressure through said discharge tube when said container is reciprocated relatively to said discharge tube, means for causing lubricant to pass from said container to said forcing means, and means carried by the outer end of said discharge tube for making sealed contact with said receiving member from any one of a plurality of different angularly related positions, said sealed contact being maintained by the pressure exerted in moving said container relatively to said discharge tube.

11. A lubricating system comprising a lubricant receiving member having a passageway for lubricant, and a compressor for supplying lubricant to said receiver, comprising a container for lubricant, a discharge tube reciprocable with respect to said container, means interposed between, and effecting communication between, said container and said discharge tube for forcing lubricant under pressure through said discharge tube when said container is reciprocated relatively to said discharge tube, means for causing lubricant to pass from said container to said forcing means, and means carried by the outer end of said discharge tube for making sealed contact with said receiving member from any one of a plurality of different angularly related positions, said sealed contact being maintained by the pressure exerted in moving said container relatively to said discharge tube.

12. A lubricant compressor comprising a container for lubricant, a cylinder communicating with said container, elements at opposite ends of said compressor for receiving oppositely directed thrusts, one of said elements having a passageway communicating with said cylinder, means actuated by a thrust imposed upon one of said elements, for discharging lubricant from said cylinder through said passageway, and means surrounding one of said elements, and movable with respect to said cylinder for pressing the lubricant in said container toward said cylinder.

13. A lubricant compressor comprising a container for lubricant, a cylinder communicating with said container, a discharge tube for said cylinder, and a piston in said container, movable with respect to and surrounding said tube, for causing lubricant to be displaced from said container into said cylinder.

14. A lubricant compressor comprising a container for lubricant, a cylinder communicating with said container, means for displacing lubricant from said cylinder including a member in said container, and a piston, movable with respect to and surrounding said member, for displacing lubricant from said container into said cylinder.

15. A lubricant compressor comprising a cylindrical container, a pump cylinder of smaller diameter than said container and communicating with said container, said pump cylinder and container being coaxial, means, caused to act by a thrust exerted along the axis of said container, for discharging lubricant from said pump cylinder, said means acting as a valve to prevent return flow of lubricant to said container, means reciprocable with respect to said container for conducting lubricant from said pump cylinder, and piston means in said container for continuously pressing against the lubricant in said container.

16. A lubricating apparatus of the class described comprising in combination a nozzle having an outwardly flaring cavity and a fitting having a contacting surface to be embraced within the flaring cavity of the nozzle, said nozzle and fitting adapted to form a lubricant-tight connection in any one of a plurality of angularly different relationships and being formed to provide a circular line of contact in any angle within the range of their cooperability.

17. In lubricating apparatus of the class described a union comprising a conduit member communicating with a source of lubricant, said conduit member formed of non-compressible material and terminating in an end having a conical outwardly flaring cavity, a second conduit member formed of non-compressible material and having a spherical head adapted to be received in the cavity of said first conduit member, and means to press said first conduit member against said second conduit member in any one of a plurality of angular relationships to effect a lubricant-tight seal between said members.

In witness whereof, I hereunto subscribe my name, this 24 day of September, 1925.

CHARLES F. WALLACE.